United States Patent [19]

Willmore

[11] 4,065,609

[45] Dec. 27, 1977

[54] POLYMERIZATION PROCESS

[75] Inventor: Bruce Albert Edward Willmore, Cockernhoe, England

[73] Assignee: Imperial Chemical Industries Limited, London, England

[21] Appl. No.: 672,603

[22] Filed: Apr. 1, 1976

[30] Foreign Application Priority Data

Apr. 17, 1975 United Kingdom ............... 15863/75

[51] Int. Cl.$^2$ ........................... C08F 2/34; C08F 4/60; C08F 10/00

[52] U.S. Cl. ..................................... 526/61; 526/139; 526/140; 526/141; 526/142; 526/159; 526/164; 526/169; 526/351; 526/901; 526/903; 526/904; 526/905

[58] Field of Search ................. 526/61, 139, 140, 141, 526/142, 159, 164, 169, 901, 903, 904, 905

[56] References Cited

U.S. PATENT DOCUMENTS

| | | | |
|---|---|---|---|
| 3,350,376 | 10/1967 | Wisseroth et al. | 526/159 |
| 3,652,527 | 3/1972 | Trieschmann et al. | 526/169 |
| 3,940,345 | 2/1976 | Caunt | 252/429 B |
| 3,969,333 | 7/1976 | Nickl et al. | 526/139 |
| 3,972,866 | 8/1976 | Fortuin et al. | 526/77 |
| 3,990,994 | 11/1976 | Appleyard et al. | 526/142 |

FOREIGN PATENT DOCUMENTS

| | | | |
|---|---|---|---|
| 745,474 | 8/1970 | Belgium. | |
| 1,020,873 | 2/1966 | United Kingdom | 526/904 |
| 1,025,622 | 4/1966 | United Kingdom. | |
| 1,164,333 | 9/1969 | United Kingdom. | |

*Primary Examiner*—Alan Holler
*Attorney, Agent, or Firm*—Cushman, Darby & Cushman

[57] ABSTRACT

Polymerization of a mono-α-olefine monomer is effected by contacting the gaseous monomer with a solid phase comprising polymer and catalyst at a pressure and temperature which are such that the temperature is in the range from tp + 0.1° C up to tp + 5.0° C, where tp is the temperature at which the monomer condenses at a pressure which is equal to the monomer partial pressure within the polymerization vessel.

11 Claims, 1 Drawing Figure

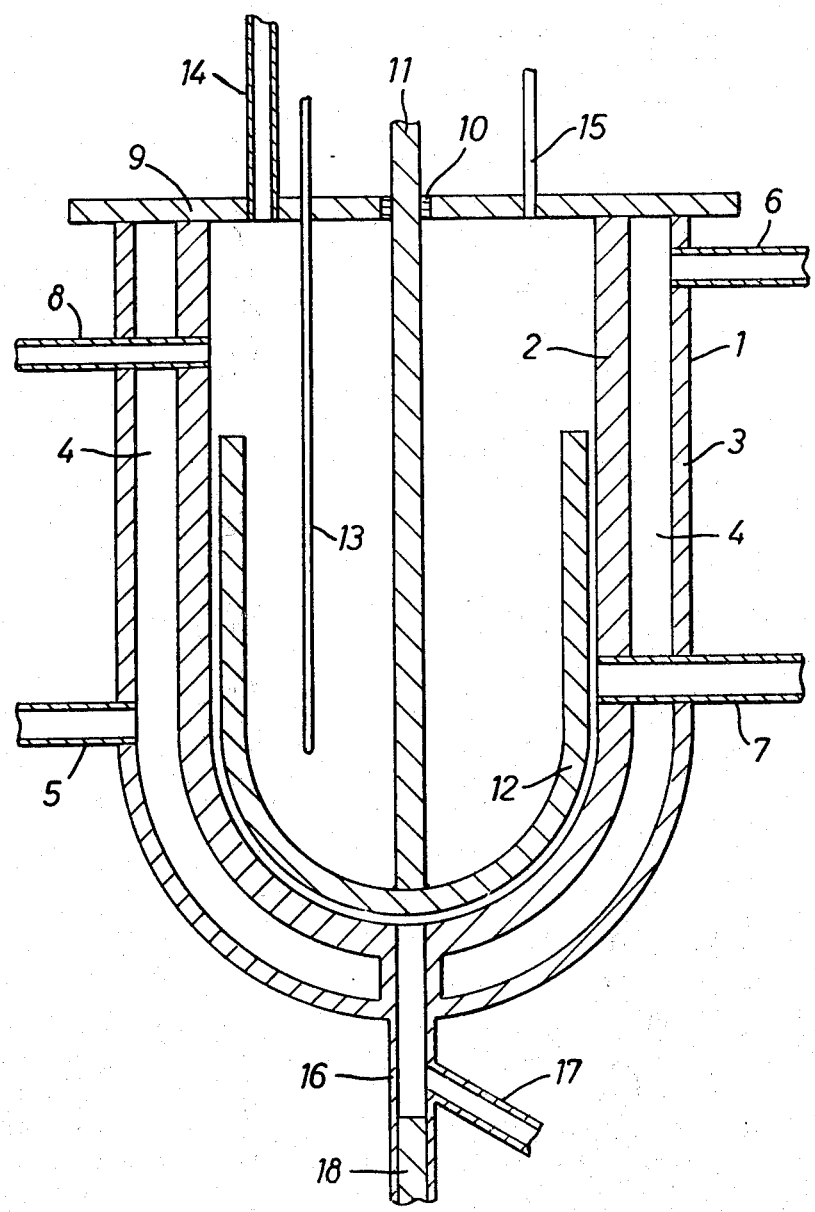

POLYMERIZATION PROCESS

The present invention relates to polymerisation processes and in particular to such processes in which a gaseous monomer is polymerised to form a solid polymer in the essential absence of a liquid phase.

According to the present invention there is provided a process for the production of a solid polymer wherein at least one gaseous mono-α-olefine monomer is contacted with a solid polymer of the said monomer or monomers, in the presence of a transition metal catalyst (as hereinafter defined), the solid polymer is agitated by stirring, and the conditions of temperature and pressure are such that the temperature is in the range from $t_P + 0.1°$ C up to $t_P + 5.0°$ C, and the partial pressure of one of the said monomers is P psig, wherein P psig is the saturated vapour pressure of that monomer at a temperature of $t_P°$ C. The temperature is preferably in the range from $T_P + 0.5°$ C. up to $t_P + 3.5°$ C.

It will be appreciated that at least one of the gaseous mono-α-olefine monomers is readily liquefied under the polymerisation conditions and the conditions are such that this monomer is at a temperature and partial pressure which are close to the dew point conditions for the monomer. The present invention is particularly suitable for the homopolymerisation of a gaseous mono-α-olefine monomer. Monomers which can be polymerised by the process of the present invention include the mono-α-olefines which, at room temperature, are volatile liquids or gases which are easily liquefied. By volatile liquids are contemplated those liquids which have a boiling temperature, at atmospheric pressure, not exceeding about 60° C. A particularly suitable mono-α-olefine is propylene.

Thus, as a preferred aspect of the present invention, gaseous propylene is contacted with a solid propylene polymer in the presence of a transition metal catalyst, the propylene polymer is agitated by stirring, the temperature is maintained in the range from $t_P + 0.1°$ C up to $t_P + 5.0°$ C, preferably from $t_P + 0.5°$ C up to $t_P + 3.5°$ C, and a propylene partial pressure is maintained at P psig, wherein P psig is the saturated vapour pressure of propylene at a temperature of $t_P°$ C.

The temperature is preferably in the range from 50° C up to 90° C, particularly from 60° C up to 80° C, and the partial pressure of propylene is, correspondingly, in the range from 250 up to 625 psig, particularly from 315 up to 525 psig.

The term "transition metal catalyst" is used herein in respect of catalytic systems which include a transition metal compound. The transition metal catalyst is typically one which comprises a mixture of at least one compound of a transition metal of Groups IVA to VIII of the Periodic Table of the Elements and an organo-compound of at least one non-transition metal of Groups IA to IIIA of the Periodic Table.

In such a mixture, the transition metal is preferably a metal of Groups IVA to VIA and can be, for example titanium, zirconium or vanadium. It is preferred that the transition metal compound is a transition metal halide or oxyhalide (for example $VOCl_2$) and it is particularly preferred to use titanium trichloride, which may be in admixture, or complexed, with compounds of other metals in particular aluminium such as aluminium alkyl halides or aluminium halides. Suitable transition metal compounds are disclosed, inter alia, in British Patent Specifications No. 877 050; 895 595; 1 349 159 and 1 391 067, and Dutch Pat. Application No. 76 00197.

The organo-compound of a non-transition metal contains at least one hydrocarbyl group attached to the metal, either through an oxygen or nitrogen atom or, preferably directly. The organo-compound of a non-transition metal can be a Grignard reagent which is substantially ether free, or $Mg(C_6H_5)_2$ or a complex compound such as $Mg(AlEt_4)_2$. It is preferred that the organo-compound is an aluminium compound which can be a lithium aluminium tetraalkyl. However, it is particularly preferred to use compounds such as bis(dialkyl aluminium)oxyalkane, a bis(dialkyl aluminium) oxide, an aluminium hydrocarbyl sulphate, an aluminium hydrocarbyl oxyhydrocarbyl or particularly an aluminium trihydrocarbyl or dihydrocarbyl aluminium halide or hydride such as an aluminium trialkyl or dialkyl aluminium halide or hydride, for example aluminium triethyl or diethyl aluminium chloride. A mixture of the organo-compounds may be used, for example a mixture of an aluminium trialkyl and a dialkyl aluminium halide.

In addition to the transition metal compound and the organo-compound of the non-transition metal, it is known to include one or more further components in a transition metal catalyst. A wide range of ogano-Lewis Bases have been proposed and these include ethers; esters such as methyl methacrylate; ketones; alchols; the sulphur containing analogues of the ethers, esters, ketones and alcohols; organo-silicon compounds such as the silanes and siloxanes; amides such as formamide; urea and thiourea and the substituted derivatives thereof such as N,N,N',N'-tetra-methylurea; alkanolamines such as β(N,N-dimethylamino)ethanol; amines such as triethylamine and tributylamine; cyclic amines such as pyridine, quinoline and substituted derivatives thereof such as α-picoline; diamines such as N,N,N',N'-tetramethylethylenediamine; and the organo phosphines, phosphine oxides, phosphites, and phosphates such as triphenyl phosphine, triphenylphosphine oxide, triethylphosphite and triethylphosphate. Useful orgao-Lewis Base compounds include secondary and tertiary amines such as dibutylamine or tributylamine, diamines such as N,N,N',N'-tetramethylethylenediamine, and compounds which include both phosphorus and nitrogen atoms, such as hexamethylphosphoric triamide; N,N,N',N'-tetramethylethyl phosphorodiamidate; N,N,N',N',N''-pentamethyl-N''-β-dimethylaminoethylphosphoric triamide; 2-dimethylamino1,3-dimethyl-1,3,2-diazaphospholidine-2-oxide and octamethylpyrophosphoramide.

The use of organo-Lewis Base compounds, or complexes including organo-Lewis Base compounds, in transition metal catalysts, is disclosed, inter alia in British Patent Specifications 803 198; 809 717; 880 998; 896 509; 920 118; 921 954; 933 236; 940 125; 966 025; 969 074; 971 248; 1 013 363; 1 017 977; 1 049 723; 1 122 010; 1 150 845; 1 208 815; 1 234 657; 1 324 173; and 1 359 328, Belgian Patent Specification 693 551; Published German Patent Applications 2 234 506 and 2 329 723 and Dutch Patent Application 76 00197.

Alternatively, or additionally, the catalyst may include a substituted or unsubstituted polyene which may be an acyclic polyene such as 3-methyl-heptatriene-(1,4,6) or a cyclic polyene such as cyclooctatriene, cyclooctatetraene or cycloheptatriene or derivatives of such polyenes such as the alkyl- or alkoxy-substituted polyenes; tropylium salts or complexes, tropolone or tropone.

The proportions of the various catalyst components can be varied widely as is well-known in the art. In general for each molecular proportion of the compound of the transition metal, there is present at least from 0.05 and up to 50, preferably 1 up to 25, especially from 2 up to 10 molecular proportions of the organo-compound of the non-transition metal.

If an organo-Lewis Base compound is present, this is used in amount in the range from 0.01 up to 10, preferably from 0.05 up to 5.0, and especially from 0.2 up to 2 molecular proportions for each molecular proportion of the compound of the transition metal, and the amount of the organo-Lewis Base compound is less than the amount of the organo-compound of the non-transition metal.

Any polyene which is present in the catalyst should preferably be present in molar proportions in the range from 0.01 up to 1.0, especially from 0.05 up to 0.5, for example 0.2 for each molar proportion of the organo-compound of the non-transition metal.

It should be appreciated that the transition metal compound may include associated with it, an organo-Lewis Base compound, which may have been milled with the transition metal compound, as in British Patent Specification 1 349 159, and Dutch Patent Application 76 00197 or which may have been included at a stage of the catalyst preparation as in British Patent Specification No. 1 391 068.

Using the process of the present invention, a high heat transfer to the walls of the polymerisation reactor is obtained. Accordingly, using a specific polymerisation system, a higher rate of polymer production can be achieved or, for a given rate of polymer production, the polymerisation system can be simplified.

Thus, if a sufficient amount of cooling can be applied to the polymerisation reactor, all of the heat of polymerisation may be removed within the reactor and under these conditions there will be no need for external cooling means such as heat exchangers and condensers for the gaseous monomer. Cooling of the polymerisation reactor is effected by circulating a cooling liquid, such as water, through the walls of the reactor and additional cooling may be obtained by introducing the monomer into the reactor as a liquid, which vapourises within the reactor by extracting the heat of evaporation from the reactor and its contents. Further additional cooling may be achieved by locating additional surfaces, for example cooling coils, within the polymerisation reactor in the vapour space above the solid polymer.

The temperature and pressure within the polymerisation reactor are continuously monitored and the rate of supply of coolant and monomer may be varied in dependence on the measured temperature and/or pressure. Thus, the rate of supply of coolant can be adjusted in dependence on the temperature, whilst the rate of monomer supply can be adjusted in dependence on the pressure.

Although it is not necessary to remove monomer from the polymerisation reactor to provide cooling thereof, it may be desirable to provide a bleed flow of monomer, typically from 1 up to 20%, by weight, for example about 10% by weight, relative to the weight of monomer fed to the polymerisation reactor, and subjecting this bleed flow to a purification step prior to being recycled to the polymerisation reactor. By this means, the level of impurities in the polymerisation reactor can be controlled.

The solid polymer formed in the reactor is agitated with a suitable agitator, for example a U-shaped stirrer/scraper. The polymer is removed from the reactor by means of an outlet valve, which is conveniently located at the base of the reactor.

In order to control the molecular weight of the polymer formed, a chain transfer agent, for example hydrogen or zinc dialkyl, is introduced into the polymerisation reactor. Hydrogen is a convenient chain transfer agent and may be introduced into the polymerisation reactor together with the stream of monomer. Small quantities of the hydrogen, and unreacted monomer, will be removed from the reactor in admixture with the solid polymer. Using hydrogen as the chain transfer agent, it is conveniently used in an amount of from 0.01 up to 5.0%, particularly from 0.10 up to 2.0%, molar relative to the monomer. It will be appreciated that the amount of chain transfer agent is dependent on the polymerisation conditions, especially the temperature, and as the temperature is increased, the amount of chain transfer agent required to obtain the desired polymer molecular weight, will decrease.

By operating the process of the present invention to polymerise propylene, a propylene polymer of high stereospecificity can be produced in a high yield. If a low pressure or higher temperature are used, either the yield in a given time is reduced or the polymer obtained has a reduced stereospecificity.

If the process of the present invention is used for the polymerisation of gaseous propylene, suitable operating conditions, at various propylene vapour pressures, are as given in Table 1.

TABLE 1

| Dew Point Conditions | | Polymerisation Conditions | |
|---|---|---|---|
| Temperature (° C) | Vapour Pressure (psig) | Temperature (° C) | Vapour Pressure (psig) |
| 10 | 98 | 10.1 to 15 | 98 |
| 21.2 | 137 | 21.3 to 26.2 | 137 |
| 32.2 | 185 | 32.3 to 37.2 | 185 |
| 43.3 | 243 | 43.4 to 48.3 | 243 |
| 54.4 | 313 | 54.5 to 59.4 | 313 |
| 65.6 | 395 | 65.7 to 70.6 | 395 |
| 76.8 | 493 | 76.9 to 81.8 | 493 |
| 87.9 | 607 | 88.0 to 92.9 | 607 |

An apparatus suitable for performing the process of the present invention is shown in the accompanying drawing.

In the drawing, a stainless steel reaction vessel 1 is provided with an inner wall 2 and an outer wall 3 which are spaced apart to form a cooling zone 4. The zone 4 is provided with an inlet pipe 5 and outlet pipe 6. An inlet pipe 7 is located at the bottom of the vertical section of the walls of the vessel 1 and passes through the outer wall 3 and opens into the vessel 1 through the inner wall 2. A further inlet pipe 8 is located near the top of the vessel 1 and this pipe 8 also passes through the outer wall 3 and opens into the vessel 1 through the inner wall 2. A cover plate 9 is secured to the top of vessel 1.

Through an opening in the centre of the cover plate 9 is rotatably mounted, through a gland seal 10, a driving shaft 11 of a stirrer/scraper. To the lower end of the driving shaft 11 is mounted a U-shaped stirrer/scraper blade 12. The blade 12 is mounted to rotate in close proximity to the inner wall 2. A thermocouple pocket 13 also passes through the cover plate 9 into the vessel 1. A bleed tube 14 is mounted in the cover plate 6 and this tube 14 is connected to purification, condensation and recycle apparatus (not shown). A gas pipe 15, mounted in the cover plate 6, is connected to pressure monitoring apparatus (not shown).

At the bottom of the vessel 1 is located a discharge pipe 16 have a side arm 17. Within the pipe 16 is located a slidable spindle 18.

In operation, the stirrer/scraper assembly (11 and 12) is rotated at a rate sufficient to thoroughly agitate the bed of polymer particles within the vessel 1. The rate of rotation will be dependent on the size of the vessel 1, the size of the blade 12 and the clearance between the blade 12 and the inner wall 2, but typically will be in the range from 20 up to 200 rpm, preferably from 50 up to 150 rpm. Cooling water is introduced through inlet pipe 5 into the zone 4 and withdrawn through outlet pipe 6. Liquid propylene monomer containing dissolved hydrogen and organo-aluminium compounds is introduced into the vessel 1 through inlet pipe 7 and a suspension of titanium trichloride in a suitable suspension medium such as hexane, heptane or liquid propylene, is introduced through inlet pipe 8. Solid polymer is withdrawn through discharge pipe 16 and side arm 17 by lowering the spindle 18.

A thermocouple in the pocket 13 monitors the temperature in the vessel 1 and the output from the thermocouple can be used to control the rate of flow of cooling water through inlet pipe 5. The pressure is monitored by apparatus connected to pipe 15, and variations in the pressure are used to control the flow of liquid propylene through the pipe 7, the flow being reduced when the pressure increases.

It will be appreciated that the temperature and pressure within vessel 1 will, in general, both change together, and thus both the rate of flow of cooling water and the rate of flow of liquid propylene may both be varied at the same time in order to maintain the reaction conditions within the desired range.

It will be appreciated that the reaction vessel described may, if desired, also be provided with an external condenser, for example attached to bleed tube 14, and arranged so that the condensate runs back into the reaction vessel. Furthermore, cooling coils, or other cooling surfaces, may be provided in the reactor, located in the vapour space. Both these additional cooling means permit a higher yield of polymer to be obtained under given reaction conditions.

EXAMPLE 1

Polymerisation was carried out in a polymerisation vessel of capacity 170 liters. The polymerisation vessel was as described with reference to the accompanying drawing. 7 kg of dry polypropylene was added while stirring the autoclave at 70° C. The stirrer speed was 60 rpm. The autoclave was evacuated, after half an hour the vacuum was released with propylene, and then the autoclave was re-evacuated. This procedure was repeated a further five times over an hour and a half, and propylene was added to the autoclave in an amount to give a pressure of 50 psi gauge. A solution of diethyl aluminium chloride in heptane was added in an amount sufficient to provide 250 millimoles of diethyl aluminium chlorie. Five minutes later, 400 millimoles of hydrogen were added. Stirring of the autoclave contents was continued for an hour, and then a suspension, in a heptane solution of 50 millimoles of diethyl aluminium chloride, containing 30 millimoles of titanium trichloride (type TAC 132 available from Toho Titanium of Japan) was added over a period of five minutes. Five minutes after completing the addition of the titanium trichloride, propylene gas was admitted to the top of the autoclave from a heated stock vessel containing liquid propylene. A pressure of 340 psi gauge was established over a period of about one hour. Hydrogen was added in increments during the pressurisation stage in a total amount of 2.6 moles. Polymerisation was effected at 340 psi gauge total pressure (propylene partial pressure 331 psi gauge) and a temperature of 60° C. Hydrogen was added in increments during the polymerisation to maintain an average hydrogen concentration of 2.7% of volume. Five hours from the start of feeding the propylene monomer, the polymerisation was terminated by switching off the propylene supply, and venting the autoclave at atmospheric pressure. The gas cap was purged with nitrogen and the polymer emptied out. The polymer obtained was a free flowing greyish powder. The polymer initially present in the reactor had the following characteristics:

| | |
|---|---|
| Ti content | 27 ppm by weight |
| Melt flow index | 29 |
| Flexural Modulus | 1.39 GN/m$^2$ |

Under the conditions used, $t_P$ is 56.8° C and thus the polymerisation temperature was $(t_P + 3.2)$ ° C. The product formed during the polymerisation had a titanium content of 76 parts per million by weight as measured by X-ray fluorescence spectrometry and after making allowance for the titanium content of the initial polymer. The flexural modulus, as measured on the total product (including the initial polymer) was 1.47 GN/m$^2$. The melt flow index of the total product (including the initial polymer) was 14.

The melt flow index was measured by ASTM Test Method D 1238-70, Condition N (190° C and 10 kg).

The flexural modulus was measured using a cantilever beam apparatus as described in Polymer Age, March 1970, pages 57 and 58. The deformation of a test strip at 1% skin strain after 60 seconds at 23° C and 50% relative humidity was measured. The test strip had dimensions of approximately 150 × 19 × 1.6 mm and was prepared as follows: 23 g of the polymer was mixed with 0.1% by weight of an antioxidant ('Topanol' CA), and the mixture was added to a Brabender Plasticiser, at 190° C, 30 rpm and under a load of 10 kg to convert it to a crepe. The crepe was placed within a template, between aluminium foil, and pressed by means of an electric Tangye Press at a temperature of 250° C. The pressing was pre-heated for a period of 6 minutes, under just enough pressure to make the polymer flow across the template, that is an applied force of about 1 ton. After the pre-heat period, the applied force was raised to 15 tons in 5 ton increments, de-gassing (that is releasing pressure) every 5 tons. After 2 minutes at 15 tons, the press was cooled by means of air and water for 10 minutes or until room temperature was reached. The plaque obtained was then cut into strips of dimensions 150 × 19 × 1.6 mm. Duplicate strips of each polymer were placed into an annealing oven at 130° C, and after 2 hours at this temperature the heat was switched off and the oven cooled to ambient temperature at 15° C per hour.

Flexural modulus is dependent on the melt flow index of the polymer and increases by approximately 0.18

GN/m² for an increase in MFI by a factor of 10, for example from MFI 3 up to MFI 30.

Comparative Example A

Polymerisation was effected at a temperature of 80° C, using 0.25% by volume of hydrogen, at a total pressure of 400 psi gauge (propylene partial pressure 399 psi gauge). Under these conditions, $t_P$ is 65.8 and thus the polymerisation temperature was $(t_P + 14.2)°$ C. The product formed in the polymerisation contained 86 parts per million by weight of titanium after making allowance for the titanium content of the initial polymer. The total product (including the initial polymer) had a flexural modulus of 1.20 GN/m² and a melt flow index of 9.2.

EXAMPLES 2 AND 3

The procedure of Example 1 was repeated using different reaction conditions. In all the Examples, 80% of the diethyl aluminium chloride was added separately and the remaining 20% was added subsequently, together with the TiCl₃ component. The results obtained are set out in Table 2, together with the results of a further comparative example.

TABLE 2

| Example or Comparative Example (a) (b) | Temperature (° C) | Total pressure (psig) | Propylene Partial Pressure (psig) | $t_P$ (° C) | Hydrogen (% volume) (c) | Melt Flow Index | Ti (ppm) (d) | Flexural Modulus (GN/m²) (e) |
|---|---|---|---|---|---|---|---|---|
| 2 | 67 | 380 | 372 | 62.5 | 2.24 | 15.4 | 59 | 1.33 |
| 3 | 70 | 400 | 397 | 65.5 | 0.7 | 19.2 | 83 | 1.36 |
| B | 80 | 400 | 398 | 65.7 | 0.37 | 17.2 | 100 | 1.26 |

Notes to Table 2

(a) In Example 2 and Comparative Example B, the initial polymer was as used in Example 1. In Example 3, the initial polymer had a melt flow index of 22, a Flexural Modulus of 1.44 GN/m² and a Ti content of 45 ppm by weight.

(b) In Example 2, the catalyst contained 36.5 millimoles of titanium trichloride and 365 millimoles of diethyl aluminium chloride. In Example 3, the catalyst contained 30 millimoles of titanium trichloride and 150 millimoles of diethyl aluminium chloride. In Comparative Example B, the catalyst contained 36 millimoles of titanium trichloride and 180 millimoles of diethyl aluminium chloride.

(c) In Example 3, the hydrogen was passed into the polymer bed, in all previous Examples the hydrogen was introduced into the gas space above the polymer bed.

(d) This represents the titanium content of the polymer actually formed during the polymerisation.

(e) Measured using the technique previously described, this is the Flexural Modulus of the total material, including the initial polymer.

EXAMPLES 4 TO 11

The procedure of Example 3 was repeated using different forms of TiCl₃, different catalyst proportions and different reaction temperature and pressure. The amount of the initial polymer was 4 kg.

The results obtained are set out in Table 3.

TABLE 3

| Ex. No. (f) | TiCl₃ (g)(h) | Temperature (° C) | Total Pressure (psig) | Propylene Partial Pressure (psig) | $t_p$ (° C) | Hydrogen (% volume) (i) | Melt Flow Index | Ti (ppm) (d) | Flexural Modulus (GN/m²) (e) |
|---|---|---|---|---|---|---|---|---|---|
| 4 | A | 70 | 400 | 397 | 65.5 | 0.67 | 33.2 | 73 | 1.33 |
| 5 | A | 60 | 320 | 318 | 55.5 | 0.48 | 11 | 130 | 1.35 |
| 6 | A* | 60 | 320 | 318 | 55.5 | 0.63 | 16.1 | 84 | 1.35 |
| 7+ | B | 60 | 320 | 317 | 55.4 | 0.79 | 5.4 | 82 | 1.34 |
| 8+ | B** | 70 | 400 | 397 | 65.5 | 0.64 | 8.0 | 39 | 1.34 |
| 9 | C | 70 | 400 | 397 | 65.5 | 0.75 | 10.6 | 82 | 1.35 |
| 10+ | D*** | 70 | 400 | 397 | 65.5 | 0.8 | 13.7 | 40 | 1.40 |

TABLE 3-continued

| Ex. No. (f) | TiCl₃ (g)(h) | Temperature (° C) | Total Pressure (psig) | Propylene Partial Pressure (psig) | $t_p$ (° C) | Hydrogen (% volume) (i) | Melt Flow Index | Ti (ppm) (d) | Flexural Modulus (GN/m²) (e) |
|---|---|---|---|---|---|---|---|---|---|
| 11+ | D**** | 70 | 400 | 397 | 65.5 | 0.8 | 9.9 | 52 | 1.30 |

Notes to Table 3
(d) and (e) are as defined in Notes to Table 3.
(f) The initial polymer was as used in Example 3 except for the Examples marked +. In the Examples marked +, the initial polymer had a melt flow index of 20.6, a Flexural Modulus of 1.38 GN/m² and a Ti content of 43 ppm by weight.
(g)TiCl₃-A was prepared in the following manner: One liter of a 33⅓/3% by volume solution of TiCl₄ in an aliphatic hydrocarbon diluent of boiling point 170° to 180° C was placed in a nitrogen-purged, dry, stainless steel autoclave. The solution was cooled to 0° C and stirred at 250 rpm. A 25% by weight solution of ethyl aluminium sesquichloride was added over a period of 8 hours, to the contents of the autoclave which were stirred and maintained at 0° C. Sufficient of the sesquichloride solution was added to provide 0.9 mole of diethyl aluminium chloride (and correspondingly 0.9 mole of ethyl aluminium dichloride) per mole of titanium tetrachloride. At the end of the addition of the sesquichloride solution, the mixture was stirred at 0° C for 2 hours, and then heated over a period of 1.5 to 2.0 hours to 115° C, whilst still stirring. The mixture was maintained with stirring, at 115° C, for 8 hours, stirring was then stopped and the solid particles were allowed to settle. The supernatant liquor was decanted off, the solid was resuspended in 3 liters of the hydrocarbon diluent, allowed to settle and the liquor again decanted off. The process of resuspending the solid and decanting off the liquor was repeated twice more. The solid was finally resuspended in the hydrocarbon diluent and the suspension of solid was removed. To the washed titanium trichloride suspension was added 0.40 mole, for each gramme atom of titanium, of phenoxathiin. The mixture was then heated up to 130° C over a period of 1.5 to 2.0 hours and this temperature was maintained for 8 hours. After 8 hours, the supernatant liquid was decanted off and the solid was washed three times (by decantation) with the hydrocarbon diluent whilst still heating the reaction vessel. The solid was finally suspended in cold hydrocarbon diluent.
TiCl₃-B was prepared using the general procedure of Example 1 of British Patent Specification No. 1 391 068, with the following differences:- Preparation of reduced solid - to a solution of 440 ml of TiCl₄ in 1840 ml of hexane maintained at 0° C, was added 1280 ml of a 50% by weight solution of diethyl aluminium chloride in hexane, the temperature being maintained at 0° C. The addition time was 4 hours and the mixture was then held at 0° C for 15 minutes. The mixture was heated up to 65° C over a period of 30 minutes and maintained at this temperature for one hour. The liquor was decanted off, the solid was washed five times using 1.5 l of hexane each time, and dried. Treatment with ether - the solid was suspended in 4 l of hexane and one liter of the suspension removed. To the remaining 3 l was added 500 ml di-isoamyl ether and the mixture was stirred at 35° C for one hour. The liquor was decanted off and the treated solid was washed four times using 1.0 l of hexane each time. The solid was then suspended in 3.5 l of hexane and 2 l of the suspension removed. The remaining 1.5 l of the suspension was allowed to settle, the liquor was decanted off and the solid dried at 65° C. Treatment with TiCl₄ - the solid was suspended in a mixture of 400 ml of hexane and 380 ml of TiCl₄. The mixture was heated to 65° C over a period of 15 minutes and held at 65° C for two hours. The liquor was decanted off, the solid was washed five times using one liter of hexane each time and dried. Treatment with diethyl aluminium chloride - the solid from the previous stage was suspended in a mixture of 500 ml of hexane and 200 ml of a 50% by weight solution of diethyl aluminium chloride in hexane. The mixture was stirred at 25° C for one hour and the liquid was then decanted off and the solid was washed five times using 1.0 l of hexane each time. The solid was finally suspended in the hydrocarbon diluent used for the preparation of TiCl₃-A.
TiCl₃-C was prepared in the following manner:- Into a stainless steel mill of 15.2 cm in length and 7.6 cm in diameter, and fitted internally with four metal strips, were introduced 200 stainless steel balls of 12.7 mm diameter and 200 stainless steel balls of 6.35 mm diameter. The mill was sealed, evacuated to 0.2 mm of mercury, and purged with nitrogen, to give a nitrogen atmosphere in the mill. 19.4 gm of titanium trichloride (Stauffer-AA) were introduced as a solid into the mill which was shaken manually. 3.27 grammes (4.0 ml) of tri-n-butyl-phosphine (about 0.16 mole based on the TiCl₃ content of the Stauffer-AA) was introduced dropwise over a period of 5 minutes into the mill from a syringe whilst the mill was being rotated slowly. When all of the tri-n-butylphosphine had been introduced into the mill, it was rotated at 120 rpm for 28 hours, without applying any heating or cooling to the mill. After milling for 28 hours, rotation of the mill was stopped and the titanium trichloride product was suspended in 100 ml of n-heptane, milled for a further one minute and readily removed from the mill. The mill was washed with two, 100 ml portions of n-heptane and the washings added to the initial n-heptane mixture.
TiCl₃-D was prepared in the following manner:- Into a stainless steel mill of 15.2 cm length × 7.9 cm diameter, and fitted internally with four metal strips, was introduced 200 stainless steel balls of 12.7 cm diameter and 200 stainless steel balls of 6.35 mm diameter. The mill was then sealed and evacuated to 0.2 mm of mercury and purged with nitrogen to give a nitrogen atmosphere in the mill. 38.4 gm of titanium trichloride (Stauffer-AA type), 5.77 gms of the complex, diphenylsulphone.2TiCl₄, and 6.23 gms of diphenylsulphone were added to the mill under nitrogen. The mill was then rotated axially for 24 hours at 120 rpm. The temperature of the mill was controlled by spraying an aqueous coolant at −5° C over the mill. After milling for 24 hours, 100 ml of an inert hydrocarbon diluent having a boiling point of 170 to 180° C was added to the mill and milling was continued for a further 5 minuts. This catalyst suspension was transferred, with further aliquots of diluent, into a stirred vessel fitted with a sintered glass filter plate. The vessel wasmaintained under an argon atmosphere and the vessel was immersed in an oil bath at room temperature. The liquid was filtered off and the solid resuspended in the inert hydrocarbon diluent. The oil bath was then heated to 120° C, this temperature was maintained for 30 minutes and the hydrocarbon was filtered off. The heating to 120° C for 30 minutes in the inert diluent was repeated once more, and the solid was finally suspended in 200 ml of cold hydrocarbon diluent.
(h) With the exception of the Examples marked with asterisks, polymerisation was effected using 20 millimoles of TiCl₃ and 100 millimoles of diethyl aluminium chloride.
*In this Example, the catalyst also included 10 millimoles of tri-n-butylamine, which was added to the polymerisation vessel with the initial charge of diethyl aluminium chloride.
**In this Example, the catalyst consisted of 10 millimoles of TiCl₃ and 50 millimoles of diethyl aluminium chloride.
***In this Example, the catalyst consisted of 5 millimoles of TiCl₃, 50 millimoles of diethyl aluminium chloride and 2.5 millimoles of tri-n-butylamine, the amine being added to the polymerisation vessel with the initial charge of diethyl aluminium chloride.
****In this Example, the catalyst consisted of 10 millimoles of TiCl₃-D, 50 millimoles of diethyl aluminium chloride and 5 millimoles of tri-n-butylamine, the amine being added to the polymerisation vessel with the initial charge of diethyl aluminium chloride.
(i) In all these Examples, the hydrogen was passed into the polymer bed.

I claim:
1. A process for the production of a solid polymer which comprises:
    contacting at least one gaseous mono-α-olefine monomer with a solid polymer of said monomer or monomers, in the presence of a transition metal catalyst,
    stirring the solid polymer to effect agitation, and
    maintaining the conditions of temperature and pressure of the reaction to be such that the reaction temperature is in the range from $(t_P + 0.1)°$ C up to $(t_P + 5.0)°$ C, and the partial pressure of one of said monomers is P psig, wherein P psig is the saturated vapour pressure of said monomer at a temperature of $t_P°$ C.

2. The process of claim 1 wherein the temperature is maintained in the range from $t_P + 0.5°$ C up to $t_P + 3.5°$ C.

3. The process of claim 1 which comprises polymerising gaseous propylene at a reaction temperature which is maintained in the range from 50° C up to 90° C.

4. The process of claim 3 which comprises maintaining the partial pressure of propylene in the range from 250 up to 625 psig.

5. The process of claim 1 wherein the transition metal catalyst is a mixture of at least one compound of a transition metal of Groups IVA to VIIIA of the Periodic Table and an organo-compound of at least one non-transition metal of Groups IA to IIIA of the Periodic Table.

6. The process of claim 5 wherein the compound of a transition metal is a halide or oxyhalide of a transition metal of Groups IVA to VIA of the Periodic Table.

7. The process of claim 5 wherein the catalyst also includes an organo-Lewis Base compound.

8. The process of claim 1 wherein hydrogen is present during the polymerisation process.

9. The processs of claim 1 which comprises continuously monitoring the temperature and pressure within the polymerisation reactor and varying the rate of supply of coolant and/or monomer to maintain the reaction temperature in the range from $(t_P + 0.1)°$ C up to $(t_P + 5.0)°$ C.

10. The process of claim 5 wherein the catalyst also contains an acyclic or cyclic polyene or an alkyl- or alkoxysubstituted acyclic or cyclic polyene.

11. The process of Claim 10 wherein said acyclic or cyclic polyene is selected from the group consisting of 3-methylheptatriene-(1,4,6), cyclooctatriene, cyclooctatetraene, cycloheptatriene, tropolone, tropone, and tropylium salts and complexes.

* * * * *